(12) United States Patent
Kitora (10) Patent No.: US 9,977,739 B2
(45) Date of Patent: May 22, 2018

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Masakazu Kitora, Kawasaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 13/966,113

(22) Filed: Aug. 13, 2013

(65) Prior Publication Data
US 2014/0068187 A1 Mar. 6, 2014

(30) Foreign Application Priority Data

Aug. 28, 2012 (JP) .................................. 2012-187393

(51) Int. Cl.
| | | |
|---|---|---|
| G06F 12/08 | (2016.01) | |
| G06F 12/0802 | (2016.01) | |
| G06F 11/14 | (2006.01) | |
| G06F 11/16 | (2006.01) | |

(52) U.S. Cl.
CPC ...... *G06F 12/0802* (2013.01); *G06F 11/1438* (2013.01); *G06F 11/1666* (2013.01)

(58) Field of Classification Search
CPC ............. G06F 12/0802; G06F 11/1438; G06F 11/1666
See application file for complete search history.

(56) References Cited

U.S. PATENT DOCUMENTS

| | | | | |
|---|---|---|---|---|
| 7,180,626 | B1 * | 2/2007 | Gassho | G06F 3/1207 358/1.14 |
| 2008/0022163 | A1 * | 1/2008 | Tanaka | G06F 11/1068 714/710 |
| 2009/0210462 | A1 * | 8/2009 | Arakawa | G06F 11/1458 |
| 2010/0146333 | A1 * | 6/2010 | Yong | G06F 1/305 714/14 |
| 2010/0169597 | A1 * | 7/2010 | Yonezawa | G06F 11/1471 711/162 |
| 2010/0174853 | A1 * | 7/2010 | Lee | G06F 12/0246 711/103 |

(Continued)

FOREIGN PATENT DOCUMENTS

| | | | | |
|---|---|---|---|---|
| JP | 2011-096053 A | 5/2011 | | |
| JP | 2011096053 | * | 5/2011 | ............. B41J 29/00 |

*Primary Examiner* — Reginald Bragdon
*Assistant Examiner* — Mehdi Namazi
(74) *Attorney, Agent, or Firm* — Canon U.S.A., Inc. IP Division (57) ABSTRACT

An image processing apparatus that schedules and executes a process in response to a request for job processing includes a detection unit configured to detect a process which requests backing up of management information to be managed in the job processing, a setting unit configured to set, in a case where a process requesting data backup is detected, a caching destination to which management information requested to be backed up is to be cached to a volatile memory or a non-volatile memory based on a data amount of the management information requested to be backed up, and a cache unit configured to cache the management information in the set caching destination.

8 Claims, 5 Drawing Sheets

(56) References Cited

U.S. PATENT DOCUMENTS

2012/0137091 A1* 5/2012 Grube ................. G06F 12/0638
                                                        711/158
2013/0086564 A1* 4/2013 Felch ....................... G06F 8/41
                                                        717/145

* cited by examiner

| 401 | ID0 ~ 99 | COUNTER INFORMATION |
| --- | --- | --- |
| 402 | ID100 ~ 199 | SEND JOB MANAGEMENT INFORMATION |
| 403 | ID200 ~ 299 | RECEIVE JOB MANAGEMENT INFORMATION |
| 404 | ID300 ~ 399 | FAX JOB MANAGEMENT INFORMATION |
| 405 | ID400 ~ 499 | IMAGE CORRECTION INFORMATION |
| 406 | ID500 ~ 599 | LOG INFORMATION |

FIG.4

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present invention relates to an image processing apparatus which includes a memory that caches management information associated with job processing, a control method for the image processing apparatus, and a storage medium.

Description of the Related Art

Conventionally, an image processing system such as a multifunction peripheral (MFP) is provided with a static random access memory (SRAM) as a backup memory device and a backup circuit using a battery, for dealing with data requiring backup. Such data requiring backup includes charging information and address information for performing data transmission.

On the other hand, a large-capacity flash memory has recently come into use as a storing unit for storing control programs and image data in the MFP.

Further, Japanese Patent Application Laid-Open No. 2011-096053 discusses realizing functions of the MFP by storing a system control program in the flash memory and storing an operation panel setting in the SRAM.

However, according to the technique discussed in Japanese Patent Application Laid-Open No. 2011-096053, a plurality of memory devices stores various data, so that the system becomes complex and the cost increases.

To solve such a problem, a new controller may be configured by moving the information conventionally stored in the SRAM to the flash memory and thus integrating the memory devices.

On the other hand, since an access size of the flash memory is different from that of the SRAM, data access by software using a conventional SRAM device interface (I/F) may lower the performance.

More specifically, the SRAM can be accessed in 1 byte unit according to the characteristics of the device. On the other hand, the flash memory can only be accessed in several kbyte units.

As a result, if the size of the data to be stored in the flash memory is small, a large amount of dummy data becomes accessed, and the data processing performance thus becomes lowered. To avoid such a problem, a control method may be performed in which direct data access is not performed with respect to the flash memory. The data is instead cached in a volatile high-speed memory such as a Double Data-Rate2 Synchronous Dynamic RAM (DDR2 SDRAM), and when update data reaches a predetermined amount, the flash memory is collectively accessed.

However, if the volatile device is used as a caching destination, the cached data may be lost when an unpredicted power discontinuity occurs.

SUMMARY OF THE INVENTION

The present invention is directed to a method for securely backing up management information to be cached using a memory appropriate for a data amount of the management information associated with job processing.

According to an aspect of the present invention, an image processing apparatus that schedules and executes a process in response to a request for job processing includes a detection unit configured to detect a process which requests backing up of management information to be managed in the job processing, a setting unit configured to set, in a case where a process requesting data backup is detected, a caching destination to which management information requested to be backed up is to be cached to a volatile memory or a non-volatile memory based on a data amount of the management information requested to be backed up, and a cache unit configured to cache the management information in the set caching destination.

According to another aspect of the present invention, a determination unit is configured to determine whether an ID of the process requesting data backup is a predetermined ID to be accessed in priority; and a control unit configured to schedule, in a case where it is determined that an ID of the process requesting data backup is the predetermined ID to be accessed in priority, a process for writing the management information in the non-volatile memory to be executed in priority to other processes.

According to yet another aspect of the present invention, a detection unit is configured to detect whether a job processing state has shifted to an abnormal state; and an issuing unit is configured to issue, in a case where it is detected that the job processing state has shifted to the abnormal state, a request to cache, in the non-volatile memory, the management information to be managed, wherein the cache unit caches, in the non-volatile memory, the management information to be cached in the volatile memory according to the issued caching request.

According to yet another aspect of the present invention, a detection unit is configured to detect whether a job processing state has shifted to an abnormal state; and an issuing unit is configured to issue, in a case where it is detected that the job processing state has shifted to the abnormal state, a request to cache, in the non-volatile memory, the management information to be managed, wherein the cache unit caches, in the non-volatile memory, all pieces of management information including the management information to be cached in the volatile memory according to the issued caching request.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
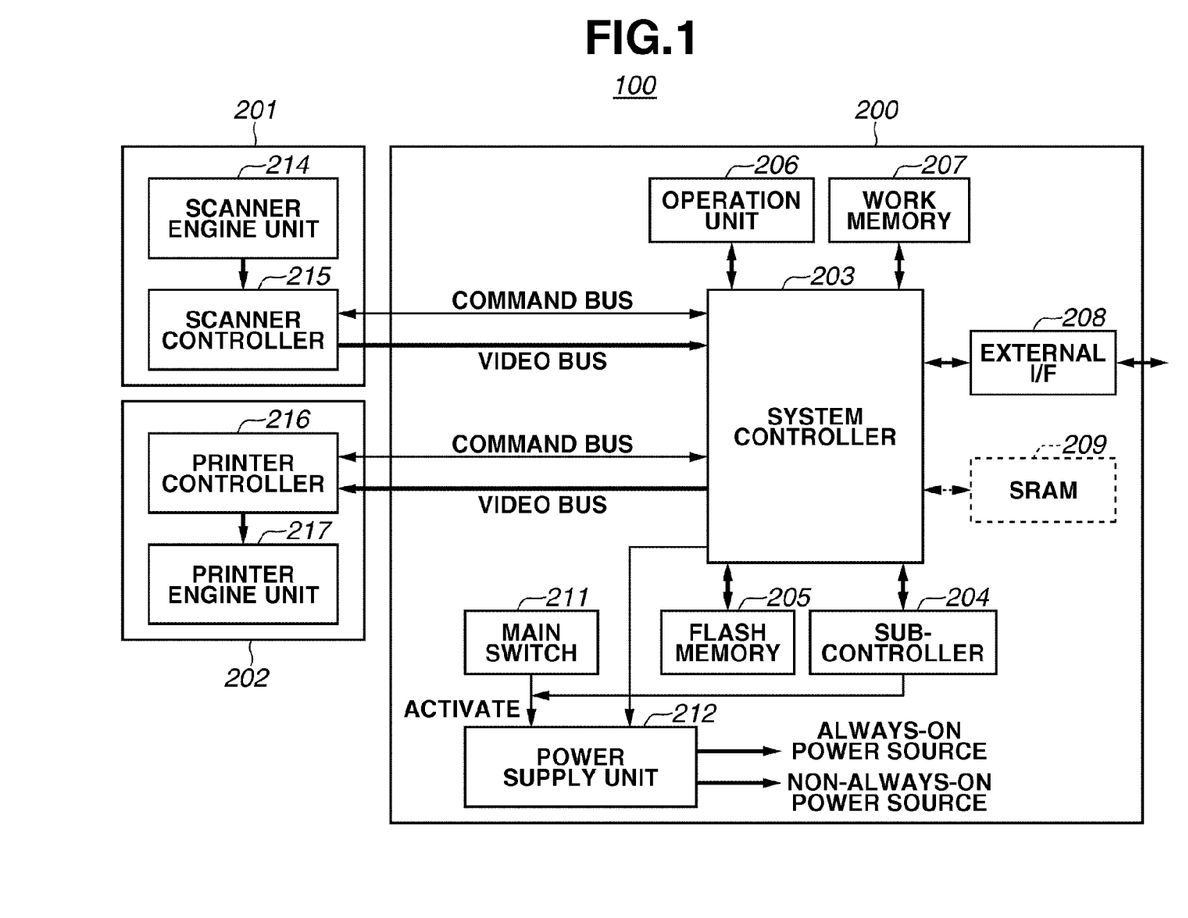
FIG. 1 is a block diagram illustrating a configuration of an image processing apparatus.

FIG. 1 is a block diagram illustrating a configuration of an image processing apparatus according to the first exemplary embodiment of the present invention. According to the present exemplary embodiment, an MFP which performs multifunction processing such as scan function processing, print function processing, data communication function processing, copy function processing, and box function processing will be described as an example. The present invention may also be applied to a printing apparatus which performs single function processing. According to the present exemplary embodiment, the image processing apparatus which schedules and performs a process in response to a request for job processing will be described as an example. The details will be described below with reference to FIG. 2.

Referring to FIG. 1, a system control unit 200 controls the entire system. A scanner unit 201 reads the image data. A printer unit 202 records, on a recording medium, the image data which has been image-processed by and output from the system control unit 200.

An internal configuration of the system control unit 200 will be described below.

A system controller 203 processes the image data, and is connected to elements to be described below via a general-purpose I/F or a custom I/F. A power supply unit 212 supplies an always-on power source and a non-always-on power source to the system control unit 200. A main switch (SW) 211 is a switch for activating the power supply unit 212. A sub-controller 204 controls image processing performed in the MFP 100.

A flash memory 205 is a non-volatile memory which stores the information required by the system control unit 200 even when the power supply unit 212 is switched off, such as a user program and counter information. An operation unit 206 receives an operation from a user, and displays, for the user, a system status and system information. A work memory 207 is a volatile memory, which is used as a work area of the system controller 203 and for temporarily storing the image data.

An external I/F 208 is a general-purpose I/F which transmits and receives, when connected to a network environment such as a local area network (LAN), the data between the image processing system and the network environment.

The internal configuration of the scanner unit 201 will be described below.

A scanner engine unit 214 reads a document and generates the image data converted to an electrical signal. A scanner controller 215 which is connected to the system controller 203 in the system control unit 200 via a command bus, i.e., a custom I/F, and a video bus, transmits the data and performs command communication with the system controller 203. Conventionally, an SRAM 209 has been included as a memory for storing system management information. However, according to the present exemplary embodiment, the image processing system stores in the flash memory 205 and manages the system management information, so that the SRAM 209 is virtually illustrated as a memory excluded from the configuration of the present system. As a result, according to the present exemplary embodiment, the system management information is managed in the flash memory 205 according to control procedures to be described below.

The internal configuration of the printer unit 202 will be described below.

A printer controller 216 which is connected to the system controller 203 in the system control unit 200 via the command bus, i.e., a custom I/F, and the video bus, transmits the data and performs command communication with the system controller 203. A printer engine unit 217 records on a recording medium the image data transmitted from the system control unit 200 to the printer controller 216.

According to the present exemplary embodiment, the MFP 100 may be used to realize various types of image processing. The copy function processing, the print function processing, and scan transfer function processing (hereinafter referred to as a SEND function processing) as processing examples of the MFP 100 will be described below.

A copy function operation will be described below.

The scanner unit 201 electrically reads the document placed on a document positioning plate (not illustrated) in the scanner engine unit 214. The scanner controller 215 then performs analog/digital (A/D) conversion and correction, and transfers via the video bus the image data to the system controller 203 in the system control unit 200. The transferred image data is then temporarily stored in the work memory 207, and the sub-controller 204 performs predetermined image processing and image compression thereon. The processed image data is stored in an image area of the flash memory 205.

The printer unit 202 and the system control unit 200 then communicate with each other via the command bus, and the system control unit 200 in synchronization with the operation of the printer unit 202 reads the compressed image data from the flash memory 205 to the work memory 207. The sub-controller 204 decompresses the read image data, and the decompressed image data is re-written in the work memory 207 and transferred to the printer unit 202. The printer controller 216 in the printer unit 202 converts the transferred image data to and records on the recording medium a recording signal.

An operation of the print function processing will be described below.

The MFP 100 receives via the external I/F 208, print data transmitted from an external device such as a personal computer (PC), and stores the print data in the work memory 207. The system controller 203 then analyzes the print data, rasterizes the print data into the image data, and stores the image data in the work memory 207. The sub-controller 204 performs predetermined image processing on and compresses the image data, and the flash memory 205 stores the processed image data. The stored image data is printed according to a procedure similar to that of the copy operation.

An operation of the SEND function processing will be described below.

Reading of the image, image processing, and compression are performed according to procedures similar to that of the copy operation, and the processed image data is stored in the flash memory 205. The system controller 203 then communicates via the external I/F 208 with the external device having an address registered on the operation unit 206. At the same time, the system controller 203 reads the image data from the flash memory 205 to the work memory 207, and if negotiation is established, the system controller 203 transmits the image data to the external device.

The software stored in the flash memory 205 performs, among the above-described control of hardware, a series of control with respect to the operations performed by the system control unit 200.

Figure 2:
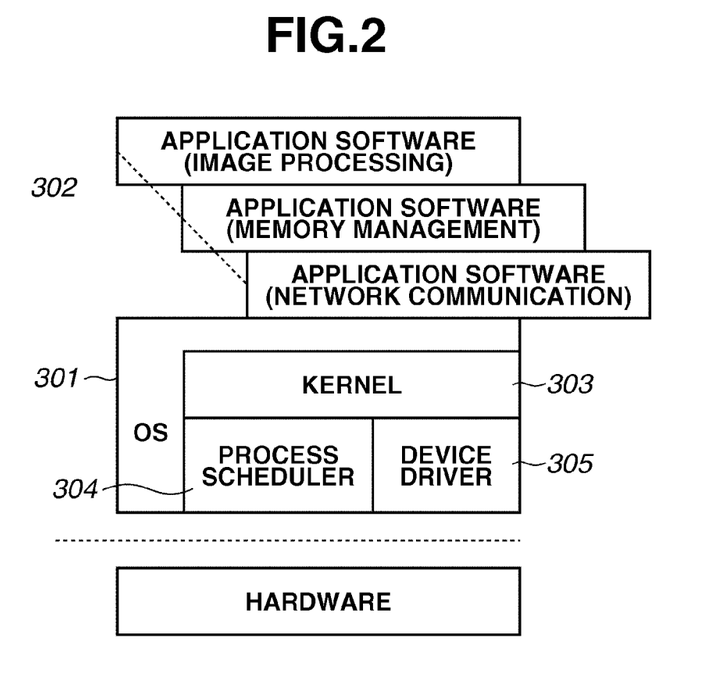
FIG. 2 illustrates a software configuration of a system controller illustrated in FIG. 1.

FIG. 2 illustrates the software configuration of the system controller 203 illustrated in FIG. 1. According to the present exemplary embodiment, a process scheduler 304 detects a process which requests backing up of the management information to be managed in the job processing. If the process scheduler 304 detects the process requesting the data backup, the caching destination to which the management information requested to be backed up is to be cached is set to a volatile memory (i.e., the work memory 207) or a non-volatile memory (i.e., the flash memory 205) based on the data amount of the management information requested to be backed up (i.e., refer to FIGS. 4 and 5).

Referring to FIG. 2, an operating system (OS) layer 301 is the software providing basic functions commonly used by a plurality of application software groups 302, and manages the entire system. The basic functions include a user interface (UI), input and output functions of the hardware, and disk and memory management. The plurality of application software group 302 provides the MFP 100 functions such as the copy function, the print function, and the SEND function. The OS layer 301 includes a kernel 303, the process scheduler 304, and a device driver 305.

The kernel 303 is the software which implements the basic functions of the OS. The kernel 303, i.e., a core portion of the OS, provides the functions such as monitoring of the various application software controlling the MFP 100 and peripheral devices, management of resources such as the disk and the memory, interruption processing, and inter-process communication.

The process scheduler 304 is a function which automatically executes the above-described processing according to a predetermined schedule.

The device driver 305 is the software for controlling and operating the devices included in the system and externally connected to the system. The OS 301 thus acts as an interface for controlling such devices, and the application software group 302 basically does not directly operate the devices.

The operation of the process scheduler 304 will be described below. The process scheduler 304 selects from a plurality of executable processes, a process to be performed based on response performance and throughput. In such a case, the process scheduler 304 selects by maintaining fairness so that execution authority is always assigned to all processes, even in an environment in which a large number of processes is performed at the same time.

Normally, the execution authority is equally assigned to all processes so that all processes are performed by time-division, and there is no process which is excluded from being scheduled due to a portion of the processes holding the execution authority for a long time.

More specifically, the process in an executable state is assigned an execution allocation period (i.e., a time slice). The process which is assigned the execution authority continues to have the execution authority while the execution allocation period of the process remains. The process which has used up the execution allocation period abdicates the execution authority to other process, and is excluded from being scheduled until the execution allocation period is re-assigned. The execution allocation period is newly assigned when there is no process on the kernel 303 of which the execution allocation period remains, waiting to be executed. By such a method, all processes are guaranteed to have the execution authority on the central processing unit (CPU), even if the process is of low execution priority.

The MFP 100 backs up various data based on each of the operations (hereinafter referred to as jobs) such as the copy, scan, and print jobs. A data backup process is also provided as one of the application software of the MFP 100, and the process scheduler 304 manages the execution thereof on the CPU.

Figure 3:
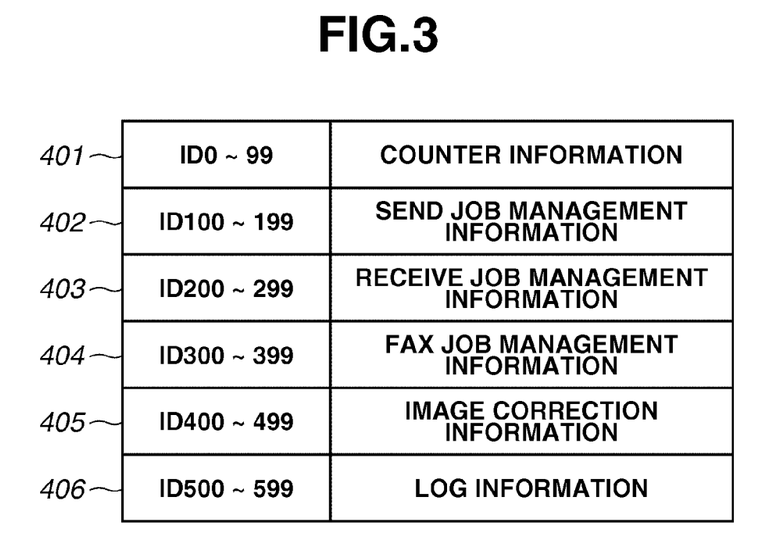
FIG. 3 illustrates a configuration of backup data stored in a flash memory.

FIG. 3 illustrates the configuration of the backup data which is stored in the flash memory 205 illustrated in FIG. 1. According to the present exemplary embodiment, the system management information is the data to be backed up.

Referring to FIG. 3, a counter information area 401 is for backing up various types of counter information for performing charging, and the counter information necessary for performing maintenance, according to the operation of the MFP 100. Identification (ID) numbers from 0 to 99 are allocated to the counter information area 401 for the software to identify the area.

A transmission job management information (i.e., SEND job management information) area 402 is for backing up address information such as the address and the name of the external device, and the image information of the external device to be used in the SEND job. The ID numbers from 100 to 199 are allocated to the transmission job management information area 402 for the software to identify the area.

A received job management information area 403 is for backing up the address information to be used in receiving the data from the external device. The ID numbers from 200 to 299 are allocated to the received job management information area 403 for the software to identify the area.

A facsimile (FAX) job management area 404 is a backup area for enabling recovery of the FAX job when an unpredicted power discontinuity occurs, such as an instantaneous interruption of the power. The ID numbers from 300 to 399 are allocated to the FAX job management area 404 for the software to identify the area.

An image correction information area 405 is for backing up calibration information of the image data. The ID numbers from 400 to 499 are allocated to the image correction information area 405 for the software to identify the area.

A log information area 406 is for backing up an operation history of the MFP 100 for each application software. The ID numbers from 500 to 599 are allocated to the log information area 406 for the software to identify the area.

As described above, since the transmission job management information is backed up in the SEND job unlike in the copy job and the print job, the amount of information to be backed up is greater for the SEND job. As a result, it becomes necessary to control the process scheduler 304 so that the performance is not greatly lowered with respect to the copy job and the print job in the following cases: The data backup with respect to the SEND job is not completed within the execution allocation period assigned by the process scheduler 304, and the copy job and the print job are caused to wait for the next assigning of the execution authority.

When each job in the MFP 100 is to be executed, the data backup process is performed at predetermined timing.

Figure 4:
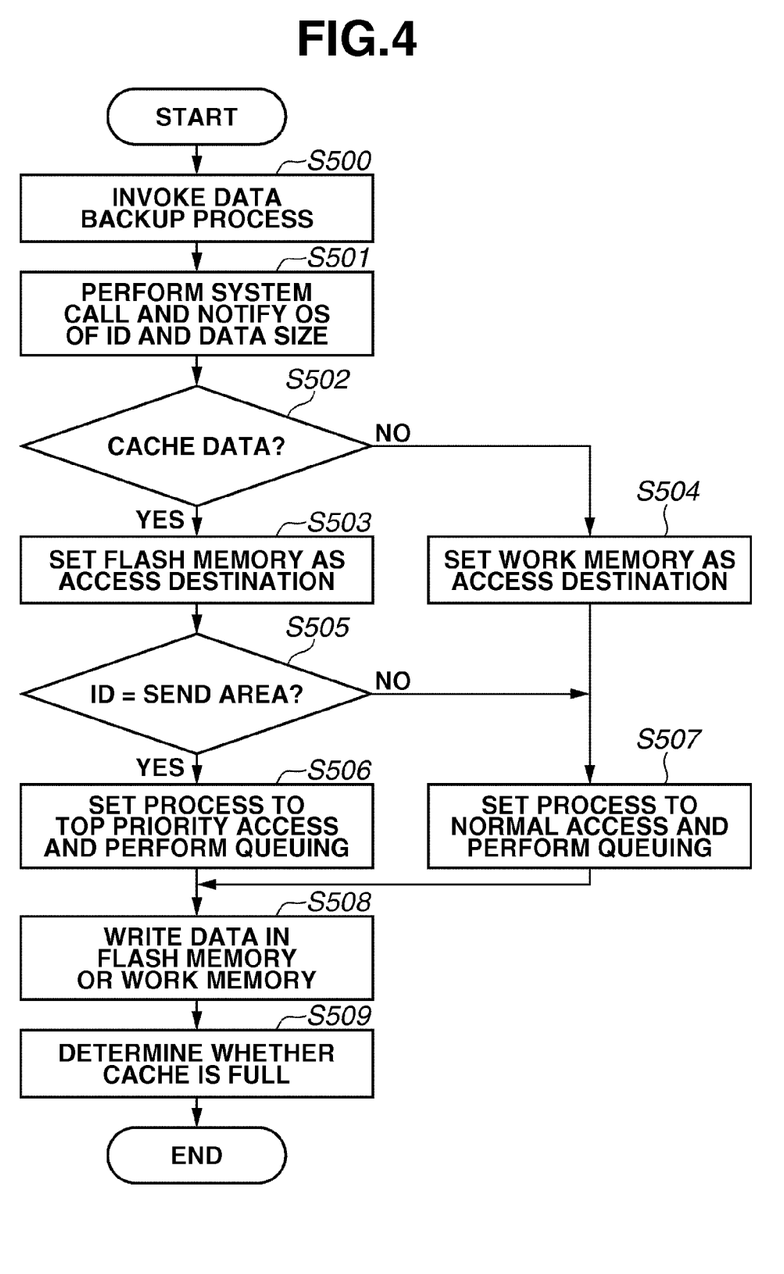
FIG. 4 is a flowchart illustrating a control method for the image processing apparatus according to a first exemplary embodiment of the present invention.

FIG. 4 is a flowchart illustrating a control method for the image processing apparatus according to the present exemplary embodiment. FIG. 4 illustrates an example of the data backup process performed in the image processing apparatus. Each of the steps is realized by the system controller 203 illustrated in FIG. 1 executing the control program stored in the non-volatile memory such as a read-only memory (ROM). The program executed by the system controller 203 will be mainly described below. Control for switching, when an event to be performed in response to the data backup process is issued, a memory destination in which the data is to be cached, to either the work memory 207 or the flash memory 205 according to the information on the size of the data requested to be backed up, will be described below.

In step S500, one of the application software groups 302 executing a job invokes the data backup process. In step S501, the data backup process which has been invoked performs a system call and requests the OS 301 to perform the data backup process. When performing the system call, the application software group 302 transfers to the OS 301 the information including the ID number as the type of the data to be backed up, and the data size.

In step S502, the OS 301 determines, based on the received information on the data size, whether to directly write in the flash memory 205 or temporarily cache in the work memory 207 the backup data. If the OS 301 determines that the data size is greater than a predetermined size (YES in step S502), the process proceeds to step S503. If the OS 301 determines that the data size is not greater than a predetermined size (NO in step S502), the process proceeds to step S504.

In step S503, the OS 301 sets the process scheduler 304 to queue the process for writing the data in the flash memory 205. In step S504, the OS 301 sets the process scheduler 304 to queue the process for writing the data in the work memory 207. The process then proceeds to step S507.

In step S505, upon receiving the request to perform the data backup process, the OS 301 confirms the received ID number and determines the information to be backed up. If the OS 301 determines that the ID number indicates the SEND job management information area 402 (YES in step S505), the process proceeds to step S506. In step S506, the process scheduler 304 queues as a top-priority process, the requested process to be performed in priority to the previously registered processes.

On the other hand, if the OS 301 determines that the ID number indicates other data (NO in step S505), the process proceeds to step S507. In step S507, the process scheduler 304 queues the process as a normal process. In such a case, the processes are queued in the order previously registered in the process scheduler 304.

In step S508, upon the process scheduler 304 assigning the execution authority of the data backup process, the device driver 305 writes the data in the flash memory 205 or a cache area in the work memory 207. In other words, the process scheduler 304 caches the management information in the set caching destination.

In step S509, after the data has been written, the OS 301 confirms whether the amount of data written in the cache area of the work memory 207 has reached the access unit amount of the flash memory 205 (herein after referred to as cache full). If cache full has been reached, the OS 301 returns cache full information to the data processing program. Upon receiving the cache full information, the data backup process issues an event with respect to the application program which is to perform a cache flushing process, and the process ends.

Further, the cache flushing process to which the event has been issued causes the process scheduler 304 to queue the cache flushing process, and moves the data from the work memory 207 to the flash memory 205, similarly as the data backup process. The cache flushing process is also queued to be accessed in priority to prevent data loss due to an unpredicted power discontinuity, and thus executed in priority.

By performing the above-described control, the data backup process is performed in an optimal processing time, and the risk of data loss due to the power discontinuity can be lowered.

When the above-described MFP 100 is executing a job such as the copy job and the SEND job, a paper jam or an error may occur. In such a state, the MFP 100 does not perform a normal operation, so that performance is not required in the data backup process. Rather, in such a case, a user performs a recovery process with respect to the paper jam or the error, so that the power may suddenly be switched off. Further, shutdown processing of the software may not be correctly performed, and as a result of a time-out by a hardware timer, an unpredicted power discontinuity becomes more likely to occur than in a normal state.

As a result, the data backup process may be controlled to reduce the risk of the data loss due to the power discontinuity when the error occurs, by adding information for determining whether a paper jam or an error has occurred in the MFP, or the MFP is in a normal state. A second exemplary embodiment of the present invention will thus be described below.

Figure 5:
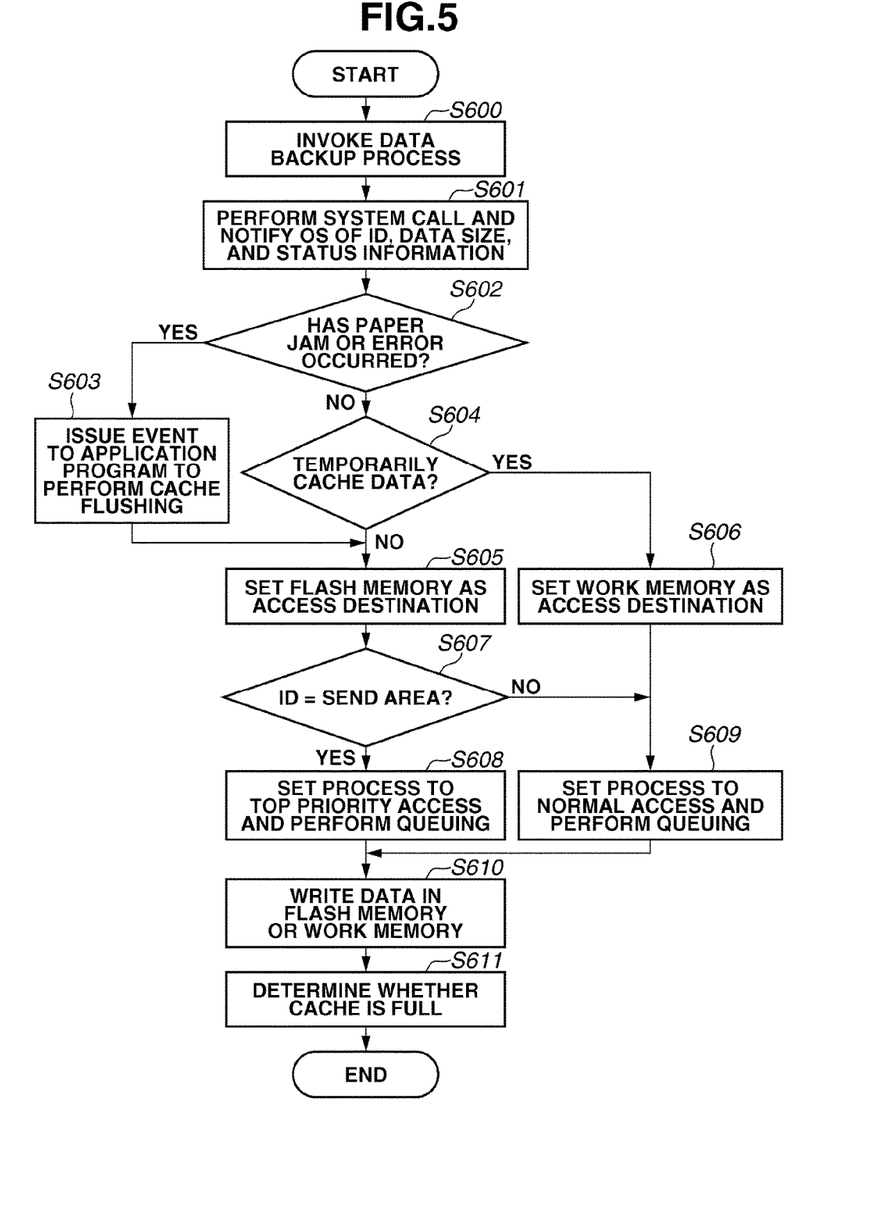
FIG. 5 is a flowchart illustrating a control method for the image processing apparatus according to a second exemplary embodiment of the present invention.

FIG. 5 is a flowchart illustrating a control method for the image processing apparatus according to the second exemplary embodiment. FIG. 5 illustrates an example of the data backup process performed in the image processing apparatus. Each of the steps is realized by the system controller 203 illustrated in FIG. 1 executing the control program stored in the non-volatile memory such as a ROM. The program executed by the system controller 203 will be mainly described below. Further, according to the present exemplary embodiment, the process scheduler 304 determines whether the ID of the process requesting the data backup is a predetermined ID to be accessed in priority. If the process scheduler 304 determines that the ID of the process requesting the data backup is a predetermined ID to be accessed in priority, control is performed to schedule the process for writing the management information in the non-volatile memory (i.e., the flash memory 205) to be executed in priority to other processes. Such a control example will be described below. According to the present exemplary embodiment, the ID indicates the information corresponding to the ID illustrated in FIG. 3.

Furthermore, according to the present exemplary embodiment, if it is detected that the job processing state has shifted to an abnormal state, a request to cache in the flash memory 205 the management information to be managed is issued. The management information to be cached in the volatile memory is then cached in the flash memory 205 in response to the issued caching request. Such an example will be described below. Moreover, an example in which all of the management information including the management information to be cached in the volatile memory is cached in the flash memory 205 in response to the issued caching request will be described below.

In step S600, one of the application software groups 302 executing a job invokes the data backup process. In step S601, the data backup process which has been invoked performs a system call and requests the OS 301 to perform the data backup process. When performing the system call, the application software group 302 transfers to the OS 301 the ID number as the type of the data to be backed up and the data size, and status information indicating whether a paper jam or an error has occurred in the MFP 100, or the MFP 100 is in the normal state.

In step S602, the OS 301 determines, based on the status information, whether to flush the backup data cached in the work memory 207. If the OS 301 determines that a paper jam or an error has occurred in the MFP 100 (YES in step S602), the process proceeds to step S603. If the OS 301 determines that the MFP 100 is in the normal state (NO in step S602), the process proceeds to step S604. According to the present exemplary embodiment, the state in which predetermined paper jam has occurred or a predetermined job transfer error has occurred is assumed as the abnormal job processing state, is described as an example. However, it is not limited thereto.

In step S603, since the status of the MFP 100 is either a paper jam or an error, the OS 301 issues an event with respect to the application program for performing the cache flushing process to flush the cache.

Further, it is necessary to unconditionally write in the flash memory 205 without caching the data requested to be backed up by the application program to prevent data loss by power discontinuity. The process thus proceeds to step S605.

The cache flushing process to which the event has been issued causes the process scheduler 304 to queue the cache flushing process, and moves the data from the work memory 207 to the flash memory 205, similarly as the data backup process. The cache flushing process is also queued as a priority process to prevent the data loss due to an unpredicted power discontinuity, and thus executed in priority.

In step S604, the OS 301 determines, based on the information on the data size received in step S602, whether to directly write the backup data in the flash memory 205 or temporarily cache the backup data in the work memory 207. If the received data size is greater than the predetermined size so that the OS 301 determines not to cache the backup data (NO in step S604), the process proceeds to step S605. If the received data size is smaller than the predetermined size so that the OS 301 determines to cache the backup data (YES in step S604), the process proceeds to step S606.

In step S605, the OS 301 sets the process scheduler 304 to queue the process for writing the data in the flash memory 205. In step S606, the OS 301 sets the process scheduler 304 to queue the process for writing the data in the work memory 207.

In step S607, upon receiving the request to perform the data backup process, the OS 301 confirms the received ID number and determines the information to be backed up. If the OS 301 determines that the ID number indicates the SEND job management information area 402 (YES in step S607), the process proceeds to step S608.

In step S608, the process scheduler 304 queues as a top-priority process, the requested process to be performed in priority to the previously registered processes.

On the other hand, if the OS 301 determines that the ID number indicates other data (NO in step S607), the process proceeds to step S609. In step S609, the process scheduler 304 queues the process as a normal process. In such a case, the processes are queued in the order previously registered in the process scheduler 304.

In step S610, upon the process scheduler 304 assigning the execution authority of the data backup process, the device driver 305 writes the data in the flash memory 205 or a cache area in the work memory 207. According to the present exemplary embodiment, if it is detected in step S610 that the job processing state has shifted to an abnormal state, a request to cache in the flash memory 205 the management information to be managed is issued. A case where the management information to be cached in the volatile memory is cached in the flash memory 205 in response to the issued caching request, and a case where all of the management information including the management information to be cached in the volatile memory is cached in the flash memory 205 in response to the issued caching request are included.

In step S611, after the data has been written, the OS 301 confirms whether the amount of data written in the cache area of the work memory 207 has reached the access unit amount of the flash memory 205 (herein after referred to as cache full). If cache full has been reached, the OS 301 returns the cache full information to the data processing program. Upon receiving the cache full information, the data backup process issues an event with respect to the application program which is to perform the cache flushing process, and the process ends.

Further, the cache flushing process to which the event has been issued causes the process scheduler 304 to queue the cache flushing process, and moves the data from the work memory 207 to the flash memory 205, similarly as the data backup process. The cache flushing process is also queued to be accessed in priority to prevent the data loss due to an unpredicted power discontinuity, and thus executed in priority.

If an error or a paper jam has occurred in the MFP 100, the status of the MFP 100 does not change until the status is improved and the MFP 100 returns to a normal state. As a result, if the data backup process is re-requested when the MFP 100 is in the error or the paper jam status, the data is not cached regardless of the data size, and the flash memory is directly accessed.

By performing the above-described control, the risk with respect to the data backup process of data loss caused by the power discontinuity due to an occurrence of an error or a paper jam is further reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-187393 filed Aug. 28, 2012, which is hereby incorporated by reference herein in its entirety.

What is claimed is:

1. An image processing apparatus including a processor and a non-volatile memory in communication with the processor, the non-volatile memory storing a control program that when executed by the processor, performs a process requested by a request for job processing, the image processing apparatus further comprising:

a volatile working memory, wherein a size of an access unit of the volatile working memory is smaller than a size of an access unit of the non-volatile memory;

a detecting unit configured to detect a request to back up of management information regarding the job processing;

a setting unit configured to set, upon condition that the request for data backup is accepted, whether the management information is to be cached to the non-volatile memory or the volatile working memory based on a predetermined data amount of the management information, wherein the setting unit determines that the management information is to be cached to the volatile working memory upon condition that the amount of management information is smaller than the predetermined data amount; and a cache unit configured to control caching the management information in a set caching destination; and a storing unit configured (i) to store the management information to the volatile working memory in a case where it is determined that a data size of the management information requested to be stored is less than or equal to the predetermined data amount and (ii) to store the management information to the non-volatile memory in a case where it is determined that a data size of the management information requested to be store is more than the predetermined data amount, wherein the cache unit back-ups the management information which has been stored by the storing unit in the volatile working memory to the non-volatile memory upon condition that it is determined that a data size of data which has been stored in the volatile working memory has reached a data amount of the access unit of the non-volatile memory, and wherein the units are implemented upon execution of instructions stored in at least one of the non-volatile memory and the volatile memory by the processor.

2. The image processing apparatus according to claim 1, further comprising:

a determination unit configured to determine whether an ID of a process requesting data backup is a predetermined ID to be accessed in priority; and a control unit configured to schedule, in a case where it is determined that an ID of the process requesting data backup is the predetermined ID to be accessed in priority, a process for writing the management information in the volatile working memory to be executed in priority to other processes.

3. The image processing apparatus according to claim 1, further comprising:

a detection unit configured to detect whether a job processing state has shifted to an abnormal state; and an issuing unit configured to issue, in a case where it is detected that the job processing state has shifted to the abnormal state, a request to cache, in the volatile working memory, the management information to be managed, wherein the cache unit caches, in the volatile working memory, the management information to be cached in the non-volatile memory according to the issued caching request.

4. The image processing apparatus according to claim 3, wherein the abnormal state of the job processing state includes a state in which a predetermined paper jam has occurred, and a state in which a predetermined job transfer error has occurred.

5. The image processing apparatus according to claim 1, further comprising:

a detection unit configured to detect whether a job processing state has shifted to an abnormal state; and an issuing unit configured to issue, in a case where it is detected that the job processing state has shifted to the abnormal state, a request to cache, in the volatile working memory, the management information to be managed, wherein the cache unit caches, in the volatile working memory, all pieces of management information including the management information to be cached in the non-volatile memory according to the issued caching request.

6. The image processing apparatus according to claim 1, wherein the non-volatile memory includes a flash memory.

7. A method for controlling an image processing apparatus that includes a processor and a non-volatile memory in communication with the processor, the non-volatile memory storing a control program that when executed by the processor, performs a process requested by a request for job processing; and a volatile working memory, wherein a size of an access unit of the volatile working memory is smaller than a size of an access unit of the non-volatile memory, the method comprising the steps of:

detecting a request to back up management information regarding the job processing;

setting, upon condition that the request for data backup is accepted, whether the management information is to be cached to the non-volatile memory or the volatile memory based working on a predetermined data amount of the management information, wherein the setting determines that the management information is to be cached to the volatile working memory upon condition that the amount of management information is smaller than the predetermined data amount;

caching the management information in a set caching destination;

storing the management information to the volatile working memory in a case where it is determined that a data size of the management information requested to be stored is less than or equal to the predetermined data amount and (ii) to store the management information to the non-volatile memory in a case where it is determined that a data size of the management information requested to be store is more than the predetermined data amount, and, wherein the caching back-ups the stored management information in the volatile working memory to the non-volatile memory upon condition that it is determined that a data size of data which has been stored in the volatile working memory has reached a data amount of the access unit of the non-volatile memory.

8. A non-transitory computer-readable storage medium storing a program that causes a computer to perform the method according to claim 7.

* * * * *